United States Patent [19]

Bellicardi et al.

[11] 4,284,039
[45] Aug. 18, 1981

[54] PRESSURE REGULATOR FOR INJECTION SYSTEMS FOR INTERNAL COMBUSTION ENGINES

[75] Inventors: Francesco Bellicardi; Roberto de Concini; Rino Bolelli, all of Bologna, Italy

[73] Assignee: Edoardo Weber S.p.A., Bologna, Italy

[21] Appl. No.: 8,465

[22] Filed: Feb. 1, 1979

[30] Foreign Application Priority Data

Feb. 7, 1978 [IT] Italy .................................. 3325 A/78

[51] Int. Cl.³ ............................................ F02M 17/00
[52] U.S. Cl. .................................... 123/463; 137/510; 251/86
[58] Field of Search ............... 137/510, 514.7; 251/86; 123/128

[56] References Cited

U.S. PATENT DOCUMENTS

| 365,656 | 6/1887 | Warren | 137/510 X |
| 2,714,392 | 8/1955 | Mercier | 137/514.7 |
| 3,106,219 | 10/1963 | Teston | 251/86 X |
| 3,405,730 | 10/1968 | Baumann | 137/510 |
| 3,511,270 | 5/1970 | Fehrenbach | 251/86 X |
| 3,520,321 | 7/1970 | Skoli | 137/510 X |

FOREIGN PATENT DOCUMENTS 1286357 1/1969 Fed. Rep. of Germany ............ 251/86

Primary Examiner—Harold W. Weakley
Attorney, Agent, or Firm—Sughrue, Rothwell, Mion, Zinn and Macpeak

[57] ABSTRACT

The pressure regulator keeping a constant difference between the fuel pressure supplied to the injectors and the fuel pressure in the intake manifold of an internal combustion engine, comprises a pressure sensitive diaphragm associated with closure means of the inlet opening of a fuel returning pipe to the vehicle tank. Spherical joint means are disposed between said closure means and said inlet opening in order to maintain a parallel relationship between them.

2 Claims, 3 Drawing Figures

PRESSURE REGULATOR FOR INJECTION SYSTEMS FOR INTERNAL COMBUSTION ENGINES

BACKGROUND OF THE INVENTION

Field of the Invention

The invention relates to a fuel pressure regulator for insertion into an injection supply system for controlled-ignition internal combustion engines. More particularly, the invention relates to a device regulating the positive pressure with which fuel is introduced into the injectors and keeping it at a constant relation to the pressure in the engine intake manifold in order to maintain the proper ratio of the air/fuel mixture under all operating conditions of the vehicle.

Devices of this kind have long been known and used. They are mechanical assemblies of elements whereby the flow of fuel supplied by a pump is divided into two unequal portions. One portion is supplied to the injectors, which absorb the quantity required under the engine operating conditions, whereas the remainder is returned to the vehicle tank.

The difference between the pressure at which fuel is supplied to the injectors and the pressure in the intake manifold must remain constant in order to ensure that the engine is properly supplied under all operating conditions. Any wear or defects in the manufacture or assembly of the mechanical components of the regulator must not affect the constant difference between the pressure of the fuel reaching the injectors and the pressure in the manifold.

More particularly the said pressure difference must be maintained constant under the various operating conditions even in the case that the diaphragm of the mobile component of the pressure regulator is not parallel to the inlet opening of the pipe system returning excess petrol to the vehicle tank. Such a diaphragm is usually associated with closure means adapted to vary the cross-section area of the petrol flow at the said inlet opening.

The main object of the invention, therefore, is to ensure that the closure means, which moves with the diaphragm, is kept parallel to the inlet plane of the return pipe system even when the plane of the diaphragm is not parallel to the inlet plane, since such parallelism ensures that the aforementioned difference remains constant.

SUMMARY OF THE INVENTION

To ensure the aforementioned parallelism, the device according to the invention comprises a metal casing, the interior of which is divided into two chambers by a diaphragm having a first surface acted upon by resilient and pneumatic forces and a second surface acted upon by hydraulic forces, the first chamber, which is partly bounded by the first surface of the diaphragm, communicating with the intake manifold via a duct and the second chamber, which is partly bounded by the second surface of the diaphragm, communicating with a pump via a second duct, communicating with the injectors via a third duct and with the vehicle tank via a last duct, the inlet of which is acted upon by means adapted to vary its cross-section, the regulator being characterised in that it comprises spherical joint means disposed between the aforementioned means adapted to vary the inlet cross-section of the last duct and the plane defined by the inlet in order to maintain a parallel relationship between them.

The aforementioned and other purposes and advantages of the invention will be more easily understood with reference to the accompanying drawings, given by way of non-limitative examples of the scope of the present industrial patent.

DETAILED DESCRIPTION OF THE INVENTION

Figure 1:
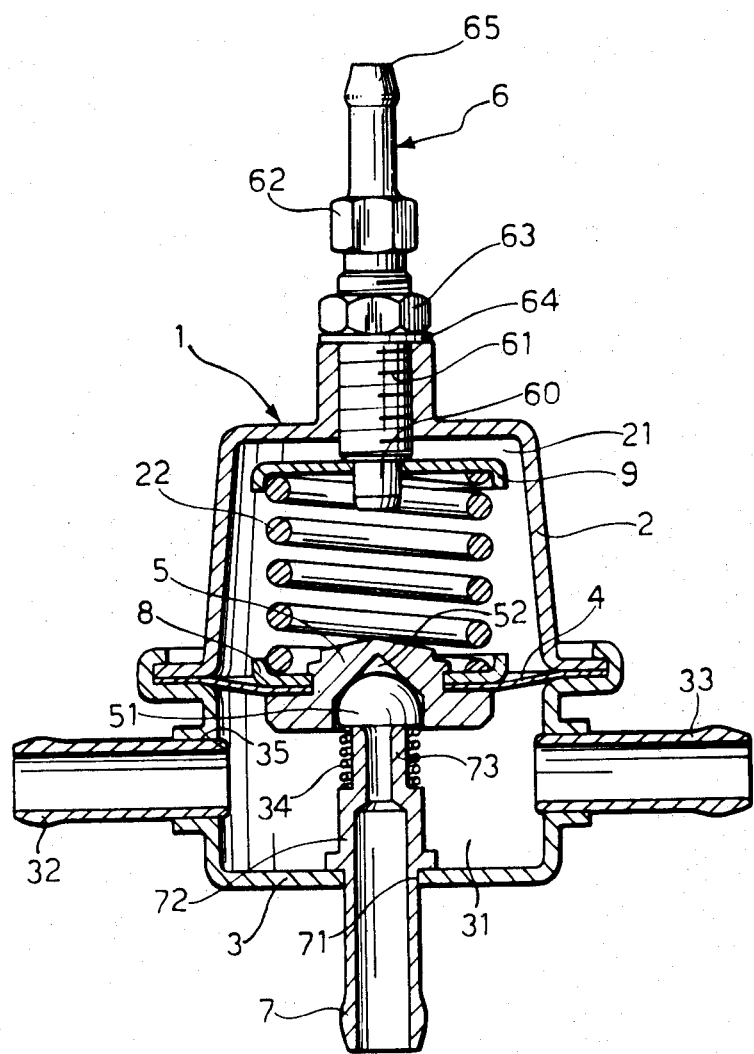
FIG. 1 is a view of an embodiment of the invention, in section along a plane extending through the axis of symmetry.

The device according to the invention forms part of a supply system for a controlled-ignition internal combustion engine. The system comprises a fuel tank, a supply pump and the engine intake manifold (conventional and therefore not illustrated in the drawings). In a system of this kind, the petrol in the tank is sucked by the pump and introduced into the regulator, after which some of the petrol is supplied to the injectors and the remainder returns to the tank. The intake manifold is connected to the device according to the invention in order to maintain a constant difference between the pressure at which fuel is sent to the injectors and the pressure in the intake manifold.

Referring to FIG. 1, casing 1 is divided into two parts 2, 3 containing chambers 21 and 31 respectively. The two chambers are separated from one another by a flexible, impermeable diaphragm 4, the central part of which is made rigid by a disc 8 secured to a co-operating disc 5.

Chamber 21 communicates with the intake manifold (not shown) via a duct (also not shown) connected to casing 1 by a tubular connection 6 screwthreaded through an aperture formed in the top portion of part 2. The threaded part of the tubular connection 6 ends at the bottom in a cylinder 60, likewise bored, which is inserted into the central bore of a disc 9; at the top, component 60 terminates outside casing 1 in a hexagonal nut 62 and a tube 65 into which the duct (not shown in the drawings) from the intake manifold is force-fitted. By acting on the hexagonal nut 62, the entire connection 6 can be moved down or upwards, i.e. towards disc 9. In order to prevent the connection being unscrewed, a washer 64 is disposed between the top surface of casing 2 and a co-operating nut 63 and prevents vibration after it has been gripped by the co-operating nut.

Chamber 31 is connected to the supply pump (conventional and therefore not shown in the drawings) by a bore 35 into which a tubular connecting element 32 is force-fitted and is adapted to hold the end of a duct, the other end of which extends from the pump (not shown). Chamber 31 is also connected to the injector system (not shown) via another duct (conventional and therefore not shown) starting from a tube 33 similar to tube 32. Finally, chamber 31 can communicate with the vehicle tank (not shown in the drawings) via a final duct (also not shown) secured to tube 7, which comes out of the bottom of casing 1.

Tube 7 has a threaded part 71 screwed into a bore in a casing 3. It has a hexagonal head 72 adapted to be gripped by a spanner, and a nozzle 73 having a completely flat end which projects inside chamber 31 and co-operates with a closure means 51 in order to define the flow cross-section for fuel from chamber 31 to the return duct to the tank via tube 7.

Closure means 51 is hemispherical and has a flat part in the same plane as nozzle 73 whereas its spherical surface is inserted into a cavity 52 in the co-operating plate 5.

Cavity 52 has a cylindrical insertion region having a radius greater than the radius of hemisphere 51, and a conical region adapted to co-operate with hemisphere 51 to define a circle of contact.

A spring 34 is disposed parallel to the axis of nozzle 73 between the top surface of the hexagonal head 72 and the flat surface of hemisphere 51. Spring 34 pushes hemisphere 51 upwards so that it is held against disc 5 when the device is in operation.

A spring 22 is inserted between disc 8 and disc 9 and downwardly pushes components 5, 8 secured to diaphragm 4, the load on components 5 and 8 depending on the axial position of plate 9 inside chamber 21. The object of the invention is to ensure that the bottom plane of hemisphere 51 is adjacent the plane of nozzle 73 when chamber 31 has to be closed off from the outlet tube 7. This is achieved owing to the spherical surface of closure means 51.

If the central plane of diaphragm 4 is not parallel to the outlet plane of nozzle 73, the front plane of the hemispherical closure means 51 will still remain in the same plane as diaphragm 4 since its hemispherical part can rotate relative to the conical surface of aperture 52 inside the circle defined by contact between sphere 51 and the conical aperture 52.

Figure 2:
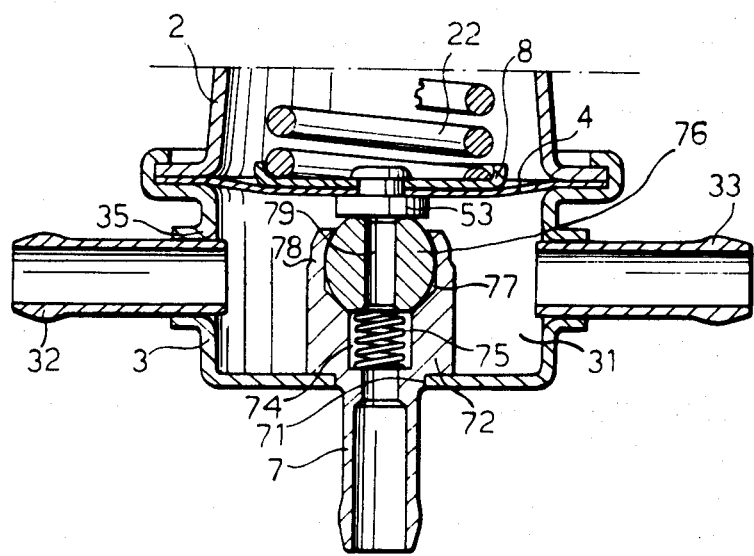
FIG. 2 is a view of a detail of a second embodiment of the invention, in a section along a plane extending through the axis of symmetry.

FIG. 2 shows a second embodiment of the invention. In FIG. 2, parts similar to those illustrated in FIG. 1 are indicated by like references. In view of its similarity, the parts of the second embodiment similar to the first will not be described.

The difference between the device in FIG. 2 and that in FIG. 1 is that the spherical joint means are differently disposed.

Tube 7 has a hexagonal head 72 terminating at the top in a projection 78 in the form of a solid of revolution containing a recess 77 adapted to hold the spherical element 76.

The recess is bounded by a frusto-conical surface, a cylindrical surface and a constriction. The bottom frusto-conical surface defines a circle at a tangent to the sphere, around which sphere 76 rotates. The cylindrical surface has a diameter greater than the maximum radius of the spherical element 76, in order to enclose it. The constriction at the top, which comprises a circular edge or lip having a diameter less than the maximum diameter of sphere 76, prevents the sphere coming out of recess 77.

The spherical element 76 has a diametrical bore 79 connecting chamber 31 to recess 74 and the pipe system in tube 7, i.e. to the return duct to the tank.

Component 76 also has two equal, diametrically opposite, parallel plane surfaces perpendicular to the axis of bore 79. The top surface abuts disc 53, which constitutes the closure means dividing the device; the bottom surface abuts a spring 75 disposed in recess 74 and pushing element 76 upwards, preventing it from moving accidentally as a result of shaking or vibration when the disc is not pressing the top flat surface of element 76. When spring 22 presses disc 8 downwards under a sufficiently heavyload, closure means 53 secured to disc 8 presses against the top flat surface of element 76, thus closing bore 79 and disconnecting chamber 31 and tube 7. Movement through recess 77 is prevented since sphere 76 is held against the conical surface of aperture 77.

Even if the front surface of the closure disc 53 is in an unusual position, resulting from an unusual position of diaphragm 4, chamber 31 is reliably disconnected from the internal pipe system in tube 7, since the spherical element 76 is free to rotate around the circle defined by the tangent to the conical surface of aperture 77, until the flat surface of element 76 is exactly in the same plane as the front surface of closure means 53.

In order to explain the operation of the device, we shall suppose that spring 22 transmits a resilient force to disc 8, which is pressed downwards together with the elements secured thereto.

Referring to FIG. 1, when spring 22 places the front surface of closure means 51 in the same plane as nozzle 73, overcoming the upward forces on the diaphragm, the motion of the aforementioned front surface is opposed by the nozzle surface until it comes to a stop. If the front surface of closure means 51 is parallel to the plane of nozzle 73, the reaction produced by component 73 on closure means 51 is uniformly distributed over the entire contact surface and has no torque relative to the axis of symmetry of closure means 51. If, on the other hand, the aforementioned surface is not parallel to the plane of nozzle 73 and moves downwards, it first meets a point on the circle of contact on the top surface of nozzle 73. Thereafter, nozzle 73 exerts a non-zero torque on closure means 51, equal to the force of reaction applied at the point of contact between the two surfaces multiplied by the distance between the line of action of the aforementioned force and the centre of the sphere. As a result of this torque, the hemisphere rotates until its flat surface is parallel to the front plane of nozzle 73. When the parallel relationship is obtained the torque cancels out, so that the inlet of nozzle 73 is kept closed.

The device in FIG. 2 operates in the same manner. Closure means 53, as it descends, meets the top front surface of the spherical element 76. If the two are in the same plane, the force transmitted from means 53 to the aforementioned surface is immediately distributed over the entire area of contact between the two surfaces, and there is zero torque. If, however, the two are not in the same plane, the lowest point of closure means 53 makes contact with the corresponding point on the top surface of element 76 and transmits a force having a moment relative to the fulcrum (the centre of the sphere) which rotates the surface of element 76 until coplanarity has been obtained, thus finally closing inlet 79.

This parallel relationship ensures that chamber 31 is reliably disconnected from the outlet of tube 7 and also ensures that the device operates properly, since the amount of fuel returned to the tank is made proportional to the travel of the diaphragm, which is the result of the negative pressure in the intake manifold, i.e. in chamber 21. In order to improve this linear relationship, nozzle 73 and closure means 51 should be shaped as in FIG. 3.

Figure 3:
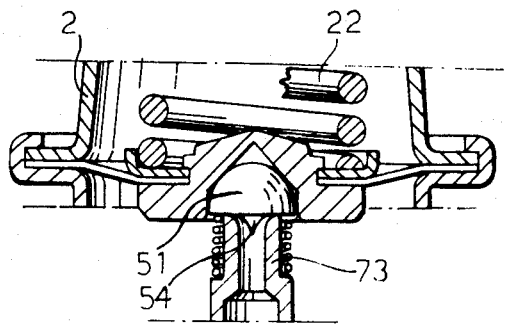
FIG. 3 is a cross-section of a detail of a third embodiment of the invention.

In FIG. 3, the nozzle inlet is connected by a surface which is round towards the interior, and closure means 51 has a projection 54 which follows the internal shape of the nozzle. During the closing phase, sealing-tightness is maintained by the contact pressure between the two surfaces, whereas when the closure means is raised from the plane of the nozzle, the fuel flows back to the tank with the minimum pressure drop, in view of the path which the liquid follows owing to the geometrical shape of the two surfaces.

The invention can have other variants without departing from its scope.

More particularly, in the version in FIG. 1, the resilience of spring 34, which holds the hemispherical closure means 51 firmly against the co-operating disc 5, can be replaced by magnetic force. If the closure means comprises a permanent magnet in contact with a ferromagnetic plate, it follows the movements of the plate and, if necessary, becomes adjusted to the plane of nozzle 73, which must be made of diamagnetic material.

The shape and dimensions of the device according to the invention can be varied without departing from its scope.

What is claimed is:

1. A pressure regulator for internal combustion engine injection systems comprising a metal casing, a diaphragm secured within said casing and dividing the interior into a first chamber and a second chamber, a first duct in said casing adapted to communicate said first chamber with an intake manifold, a second duct in said casing adapted to communicate said second chamber with a pump, a third duct in said casing adapted to communicate said second chamber with fuel injectors, and a fourth duct in said casing having an inlet extending into said second chamber adapted to communicate said second chamber with a fuel tank, closure means operatively associated with said diaphragm for opening and closing said inlet of said fourth duct, said closure means comprising a hemispherical valve member having a spherical portion and a flat surface, a support means connected to said diaphragm and having a recess therein opposed to said inlet of said fourth duct for rotatably receiving said spherical portion of said valve member with said flat surface facing said inlet and means for biasing said spherical portion of said valve member into contact with said recess, said spherical portion having the center thereof lying in the plane of said flat surface, said means for biasing said spherical portion into contact with said recess is comprised of a coil spring surrounding said fourth duct and engaging said flat surface.

2. A pressure regulator as set forth in claim 1 further comprising an appendix projecting from said flat surface and having a configuration complimentary to the internal configuration of the inlet of said fourth duct.

* * * * *